United States Patent [19]

McWethy

[11] Patent Number: 5,060,962

[45] Date of Patent: Oct. 29, 1991

[54] REAR WHEEL CAMBER SLEEVE ASSEMBLY FOR A WHEELCHAIR

[75] Inventor: Robert T. McWethy, Ventura, Calif.

[73] Assignee: Everest & Jennings, Inc., Camarillo, Calif.

[21] Appl. No.: 529,316

[22] Filed: May 21, 1990

[51] Int. Cl.[5] ........................ B62M 1/14; B62D 17/00

[52] U.S. Cl. .............................. 280/304.1; 280/250.1; 280/661; 297/DIG. 4

[58] Field of Search .................. 280/250.1, 304.1, 642, 280/646, 42, 647, 650, 661; 297/DIG. 4

[56] References Cited

U.S. PATENT DOCUMENTS

| | | | |
|---|---|---|---|
| 774,042 | 11/1904 | Cooper | 280/661 X |
| 4,405,142 | 9/1983 | Whetstine | 280/250.1 |
| 4,489,955 | 12/1984 | Hamilton | 280/250.1 |
| 4,684,150 | 8/1987 | Specktor et al. | 280/661 |
| 4,768,797 | 9/1988 | Friedrich | 280/250.1 |
| 4,805,925 | 2/1989 | Haury et al. | 280/250.1 |

*Primary Examiner*—Charles A. Marmor
*Assistant Examiner*—Kevin Hurley
*Attorney, Agent, or Firm*—Kelly Bauersfeld & Lowry

[57] ABSTRACT

An improved camber sleeve assembly is provided for rotatably supporting the main or large rear wheels on the frame of a wheelchair or the like. The camber sleeve assembly comprises a camber plate adapted for connection to the wheelchair frame at one side thereof. A pair of camber sleeve members are mounted in aligned relation at opposite sides of the camber plate and cooperatively define an angularly set bore for receiving and supporting an axle bushing at a selected chamber angle, with the axle bushing being adapted in turn to receive an axle pin of a wheelchair wheel. An alternative camber angle can be obtained by use of a different pair of sleeve members defining a bore set at the alternative angle.

13 Claims, 3 Drawing Sheets

REAR WHEEL CAMBER SLEEVE ASSEMBLY FOR A WHEELCHAIR

BACKGROUND OF THE INVENTION

This invention relates generally to improvements in the mounting of the large or main rear wheels for a wheelchair or the like. More particularly, this invention relates to an improved camber sleeve assembly for rotatably receiving and supporting the axles of the wheelchair wheels at a variably selected yet rigidly fixed camber angle.

Wheelchairs in general are relatively well-known in the art to include interconnected frame components having a seat structure mounted thereon, with the frame components being supported for rolling movement by relatively large rear wheels and comparatively smaller front wheels. In many such wheelchairs, various structural adjustment features are provided including, for example, seat position and/or height adjustment, armrest position, etc., to meet the needs of the individual using the wheelchair. In addition, some wheelchair designs incorporate means for adjusting the positions of the relatively large rear wheels, such as adjustment of the vertical height of the wheel axis, adjustment of the lateral position of the wheel axis with respect to the wheelchair seat structure, and/or adjustment of the rear wheel camber angle.

Typically, adjustment of the rear wheel camber angle has been accomplished by supporting a wheel axle within a bushing or sleeve which is mounted in turn onto a camber plate secured at a selected camber angle to the wheelchair frame. In accordance with one technique, as described in U.S. Pat. No. 4,477,098, washers or shims are used to mount the camber plate onto the wheelchair frame at the desired camber angle. In another approach, as described in U.S. Pat. No. 4,768,797, the camber plate includes multiple mounting holes oriented at different angles to achieve any one of several camber angle mounting positions. In either case, the camber angle is obtained by the particular mounting orientation of the camber plate relative to the wheelchair frame, such that removal and reinstallation of several bolts or screws are typically required in order to select and/or change the camber angle of each rear wheel. Moreover, the use of shims and the like to set the camber angle results in an assembled structure which often has inadequate rigidity and strength to withstand normal loads in a wheelchair environment.

Accordingly, there exists a significant need for improvements in devices for selecting and/or adjusting rear wheel camber angle in a wheelchair, particularly wherein the device is quickly and easily set to a selected position to provide rigid and durable wheel support at the selected camber angle. The present invention fulfills these needs and provides further related advantages.

SUMMARY OF THE INVENTION

In accordance with the invention, an improved camber sleeve assembly is provided for a wheelchair or the like to support the main rear dive wheels at a selected one of several camber angles relative to a wheelchair frame. The camber sleeve assembly comprises a camber plate fixedly mounted onto one side of the wheelchair frame, in combination with a pair of camber sleeve members for mounting onto the camber plate and cooperatively defining an angularly set bore disposed at a selected camber angle. An axle bushing is supported within this bore at the selected camber angle and is adapted to receive and support the axle pin of a wheelchair wheel.

In the preferred form, the camber sleeve members comprise an internally threaded inboard sleeve member mounted at the inboard side of the camber plate in generally aligned relation with an unthreaded outboard sleeve member at the outboard side of the camber plate. An externally threaded axle bushing is threadably supported by the inboard sleeve member and extends through an opening in the camber plate and further through the outboard sleeve member. A nut is threaded onto an outboard end of the axle bushing in abutting relation with the outboard sleeve member to clamp the camber sleeve members tightly against the camber plate. The camber sleeve members support the axle bushing at the selected camber angle, wherein this camber angle can be altered by use of an alternative pair of camber sleeve members which define a bore set at a different angle.

In accordance with further aspects of the invention, the camber plate opening is desirably formed as an elongated slot extending generally in a fore-aft direction relative to the wheelchair frame. With this geometry, the fore-aft position of the camber sleeve members can be variably selected in addition to wheel camber angle. A lock foot formed on one of the sleeve members may be removably seated within one of a plurality of longitudinally spaced detents defined by the camber plate to assist in retaining the sleeve members in the selected fore-aft position of adjustment.

Other features and advantages of the present invention will become more apparent from the following detailed description, taken in conjunction with the accompanying drawings which illustrate, by way example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
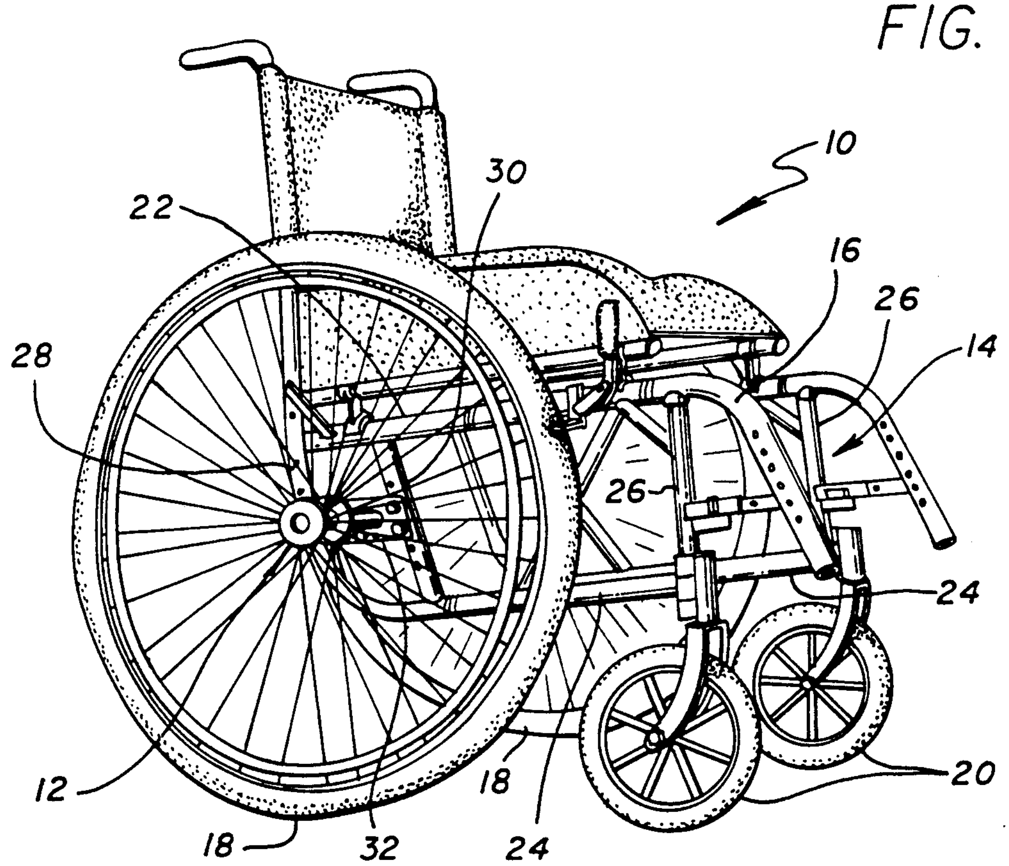
FIG. 1 is a perspective view depicting a wheelchair including rear wheels mounted at a selected camber angle by use of a camber sleeve assembly embodying the novel features of the invention.

As shown in the exemplary drawings, a wheelchair referred to generally in FIG. 1 by the reference numeral 10 includes the rear wheel camber sleeve assembly 12 of the present invention for rotatably supporting the large or main rear drive wheels of the wheelchair. In this regard, the general construction of the illustrative wheelchair 10 is representative of lightweight folding wheelchairs formed predominantly from metal tubing frame components.

More particularly, the wheelchair 10 conventionally includes left and right side frames 14 and 16 adapted for respectively supporting a pair of relatively large main rear wheels 18 and a corresponding pair of relatively small front caster wheels 20. Each of the side frames includes a pair of generally horizontal, longitudinally extending upper and lower frame members 22 and 24 which are rigidly interconnected by a front support post 26 and a spaced pair of rear support posts 28 and 30. In addition, the side frames 14 and 16 are interconnected by laterally extending frame components which may be adapted to collapse or fold to a compact geometry, and which further cooperate with the side frames in a deployed configuration to support a conventional seat and backrest for the wheelchair.

The camber sleeve assembly 12 of the present invention is adapted to mount onto each side frame 14 and 16 to rotatably support the rear wheel 18 at a selected camber angle. In this regard, the invention is adapted for easy and convenient selection of any one of several camber angles by appropriate selection of sleeve assembly components. However, when the selected components are installed onto the side frame 12 or 14. The sleeve assembly 12 provides a rigid and secure structure for rotatably supporting the axle pin of the associated wheelchair wheel 18. In normal use, matching camber sleeve assemblies 12 will be mounted onto both of the side frames 14 and 16 for respectively supporting the two rear wheels 18 at the same camber angle relative to the wheelchair frame.

Figure 2:
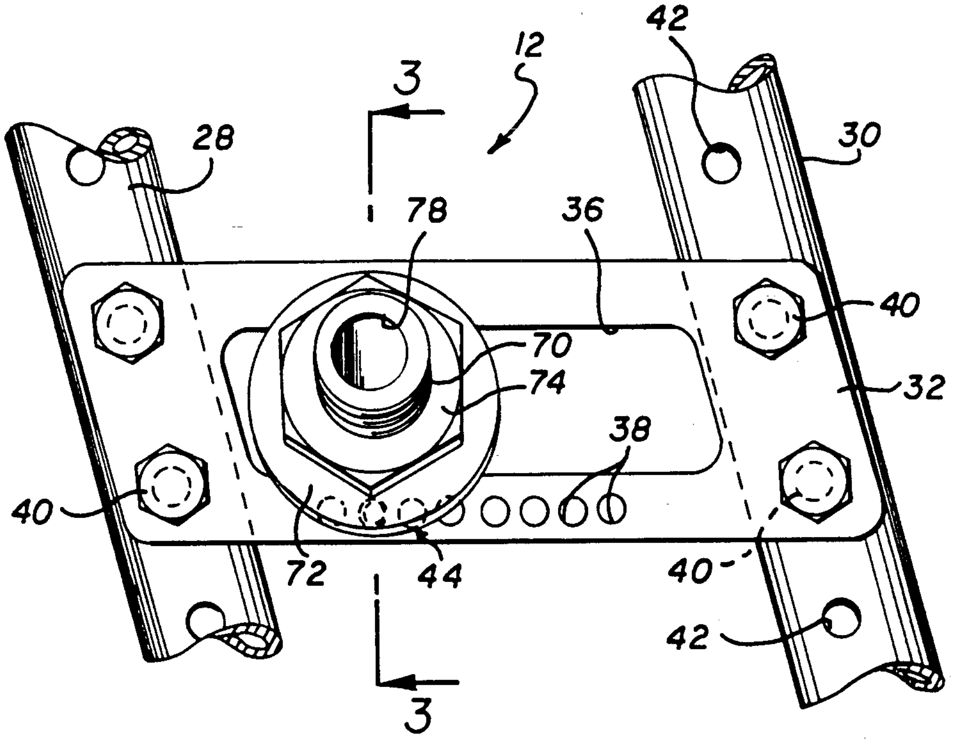
FIG. 2 is an enlarged outboard side elevation view depicting one of the camber sleeve assemblies mounted on the frame of the wheelchair.
Figure 3:
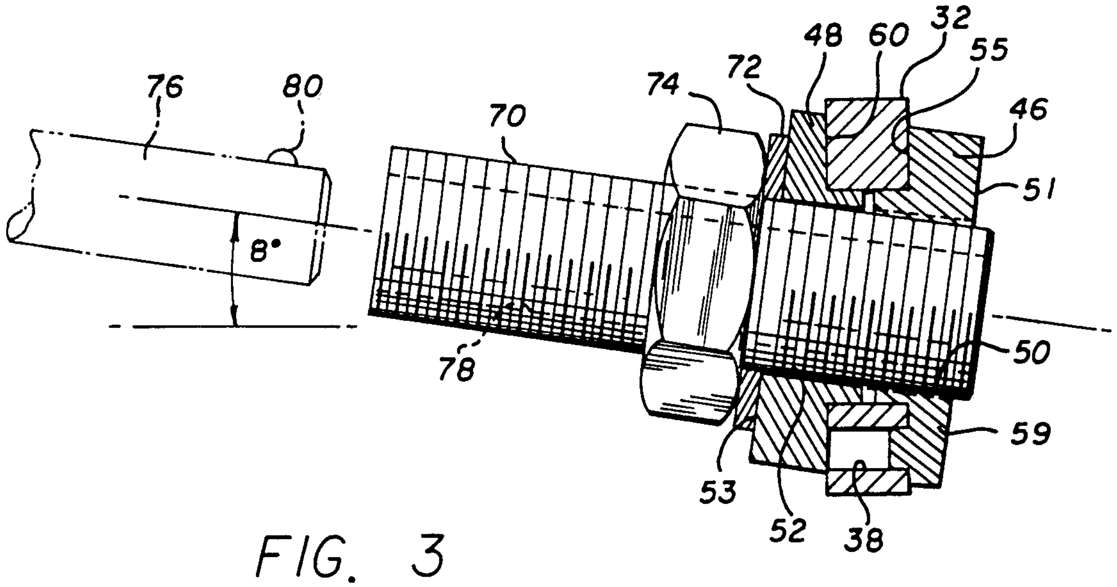
FIG. 3 is an enlarged fragmented vertical section taken generally along the line 3—3 of FIG. 2.
Figure 5:
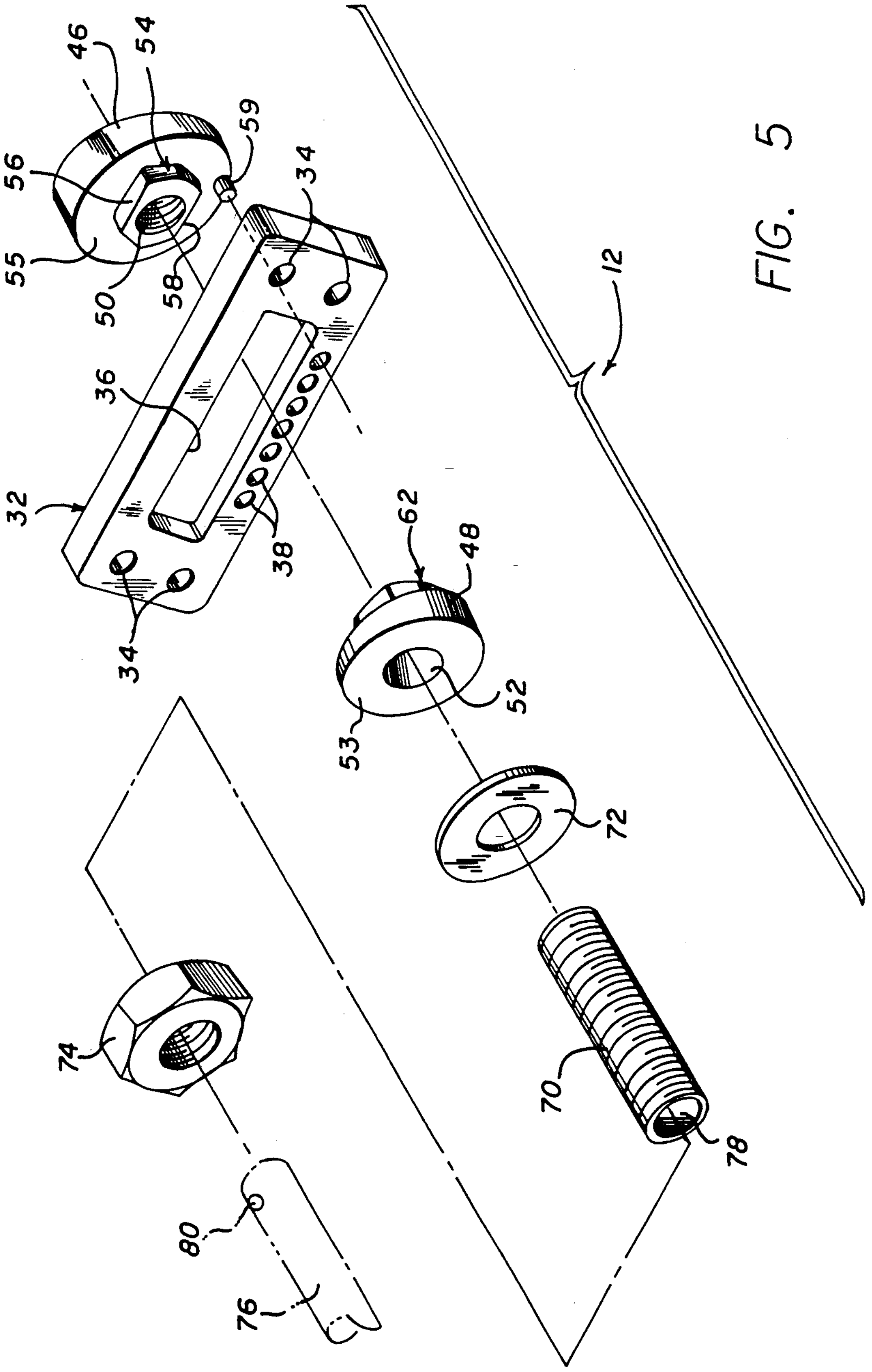
FIG. 5 is an enlarged exploded perspective view depicting components of the camber sleeve assembly.

As shown in FIGS. 2, 3 and 5 with respect to the camber sleeve assembly 12 mounted onto the right side frame 16, each camber sleeve assembly 12 comprises a camber plate 32 for mounting fixedly onto the rear support posts 28 and 30. The illustrative camber plate 32 has a generally rectangular or parallelogram shape to span the fore-aft spacing between the rear support posts 28 and 30, with short sides of the camber plate 32 being inclined at generally the same angle as the support posts 28 and 30. The camber plate 32 includes four mounting holes 34 (FIG. 5) near the four corners thereof and a longitudinally elongated slot 36 which is oriented generally horizontally when the plate is mounted onto the wheelchair. A plurality of indexing detent holes 38 are positioned between a lower margin of the slot 36 and the lower edge of the camber plate 32.

The rear support posts 28 and 30 include a plurality of vertically spaced openings or holes 42, with the spacing thereof generally corresponding to the spacing between the pairs of mounting holes 34 in the camber plate 32. One side of the camber plate 32 is mounted to the rear support post 28 by means of a pair of threaded bolts 40 or the like, with the bolt 40 passing through the holes 34 and 42 and then secured in position by means of a nut (not shown) or the like. The opposite side of the camber plate 32 is similarly mounted to the other support post 30 by means of additional bolts 40. The vertical position of the camber plate 32 or the support posts is chosen to select the vertical position of the rotational axis for each wheel 18.

The camber sleeve assembly 12 further includes a pair of camber sleeve members identified generally by reference numeral 44 and adapted for clamp-on mounting onto the camber plate 32 on opposite sides of the camber plate. More specifically, an inboard sleeve member 46 is mounted on the camber plate 32 at the inboard side thereof in generally aligned or coaxial relation with an outboard sleeve member 48 disposed on the outboard side of the plate 32. In cooperation with each other, these sleeve members 46 and 48 define a generally right cylinder structure with a bore extending therethrough at a selected camber angle which may extend horizontally or otherwise be inclined at a small angle when the sleeve members are mounted onto the camber plate 32. As shown best in FIG. 5, this bore is defined by an internally threaded bore 50 formed in the inboard sleeve member 46 and a smooth bore 52 formed in the outboard sleeve member 48. The combined bores 50 and 52 are formed perpendicularly to the outwardly presented faces 51 and 53 of the two sleeve members.

An interior face 55 of the inboard camber sleeve member 46 includes a hub 54 to project part-way into the slot 36 of the camber plate 32. The hub 54 has opposed flat parallel surfaces 56 and 58 to cooperate with the interior parallel flat surfaces of the slot 36 in the camber plate 32. This interior face 55 is angled or skewed with respect to the exterior base surface 51 of the inboard sleeve member 46 such that an upper portion of the sleeve member 46 has a greater thickness than the lower portion. With the interior face 55 angled in this manner, the threaded bore 50 in the sleeve member 46 is angled to incline at the selected camber angle relative to the wheelchair. The inboard sleeve member 46 also includes a downwardly projecting lock foot 59 beneath the lower flat surface 58 of the hub 54 for reception into one of the indexing holes 38 in the camber plate 32.

In a similar manner, an interior face 60 of the outboard sleeve member 48 is also angled with respect to its exterior base surface 53 at an angle complementary to the interior face 55 of the inboard sleeve member 46. This interior face 60 also includes a hub 62 having appropriate opposed and flat parallel surfaces to project part-way into the slot 36 of the camber plate and to cooperate with the interior parallel flat surfaces thereof. This results in the lower portion of the outboard sleeve member 48 having a greater thickness than an upper portion thereof, and aligns the axis of the central smooth bore 52 thereof with the threaded bore 50 of the inboard sleeve member 46.

The inboard and outboard sleeve members 46 and 48 are clamped onto the camber plate 32 by an externally threaded axle bushing 70. As shown best in FIGS. 3 and 5, the threaded axle bushing 70 is passed through the smooth bore 52 of the outboard sleeve member 48 and further through the plate slot 36 for thread-in engagement with the inboard sleeve member 46. A threaded nut 74 is the installed onto the outboard end of the axle bushing 70 to tightly clamp the camber plate and outboard sleeve member 48 between the nut and the inboard sleeve member 46. A washer 72 will typically be used at the inboard side of the nut 74. Importantly, this clamp-on mounting occurs with the inboard sleeve member 46 oriented in the selected fore-aft position along the slot 36, with the lock foot 59 seated within a selected one of the index holes 38.

The rear wheel 18 of the wheelchair can then be installed quickly and easily by inserting a wheel axle pin 76 (FIGS. 3 and 5) into the smooth axial bore 78 of the axle bushing 70. This axle pin 76 normally comprises conventional lock pin having a retractable spring-biased ball 80 at the end thereof to maintain the axle pin 76 within the bushing 70.

Figure 4:
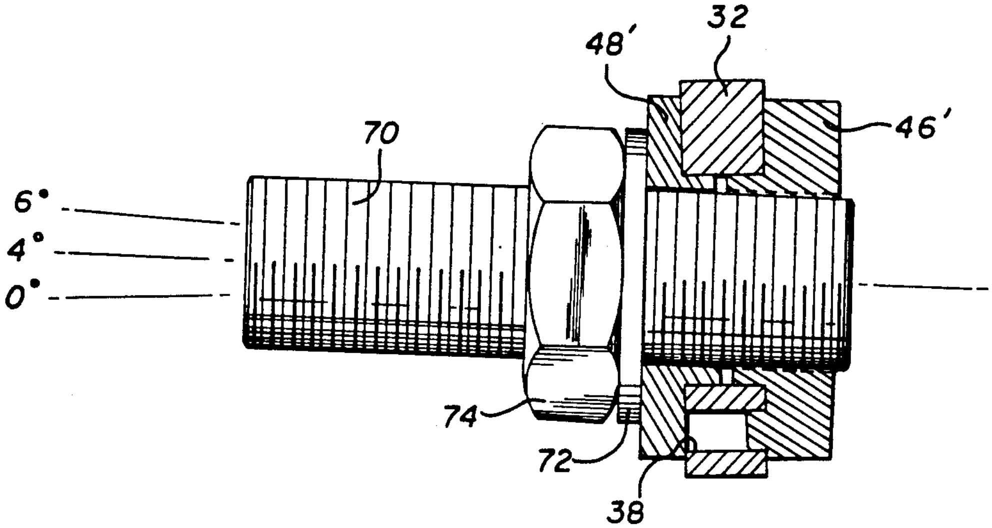
FIG. 4 is an enlarged fragmented vertical section view similar to FIG. 3, but depicting the use of alternative camber sleeve components to provide an alternative rear wheel camber angle.

With this construction, the camber sleeve assembly 12 of the present invention provides a stable and rigid structure for supporting large rear wheel of a wheelchair at a selected camber angle. The camber plate 32 can be securely fastened to the wheelchair frame in a desired vertical position, irrespective of the particular camber angle to be used. As shown in FIG. 3, the camber sleeve members 46 and 48 can be mounted onto the camber plate 32, with the thus-defined bore being oriented at an illustrative camber angle of about eight degrees. FIG. 4 depicts the use of an alternative pair of sleeve members 46' and 48' to achieve an alternate camber angle of about four degrees. Still other pairs of sleeve members can be shaped and selected to yield other alternative camber angles, such as a camber angle of zero or six degrees as depicted in FIG. 4.

Accordingly, during initial set-up of a wheelchair for a particular individual, selection of the camber sleeve members permits selection of wheel camber angle. Moreover, the mounting position of the camber plate 32 and the sleeve components 44 permits customized selection of chair height and the fore-aft location of the chair center of gravity. Importantly, once these parameters are selected, the camber sleeve assembly 12 is locked in a rigid and secure orientation to provide a sturdy chair construction.

A variety of modifications and improvements to the improved rear wheel camber sleeve assembly of the invention will be apparent to those skilled in the art. Accordingly, no limitations on the invention is intended by way of the description herein and accompanying drawings, except as set forth in the appended claims.

What is claimed is:

1. A camber sleeve assembly for mounting wheel onto a frame of a wheelchair, said assembly comprising:

a camber plate adapted for mounting onto the frame of a wheelchair;

at least one camber sleeve member having a threaded bore formed therein at a selected camber angle;

means for mounting said at least one camber sleeve member onto said camber plate; and an externally threaded axle bushing received threadably within said bore.

2. The camber sleeve assembly of claim 1 wherein said at least one camber sleeve member comprises a plurality of camber sleeve members each having a bore formed therein at a selected different camber angle, said mounting means being for mounting a selected one of said sleeve members onto said camber plate.

3. The camber sleeve assembly of claim 1 wherein said at least one camber sleeve member comprises a pair of sleeve members cooperatively defining said bore, said mounting means being for mounting said pair of sleeve members in generally aligned relation at opposite sides of said camber plate.

4. The camber sleeve assembly of claim 1 wherein said at least one camber sleeve comprises a plurality of pairs of sleeve members each cooperatively defining a bore at a selected different camber angle, said mounting means being for mounting a selected one of said pairs of sleeve members in generally aligned relation at opposite sides of said camber plate.

5. The camber sleeve assembly of claim 3 wherein said mounting means comprises means for clamping said sleeve members onto opposite sides of said camber plate.

6. The camber sleeve assembly of claim 3 wherein said pair of camber sleeves comprise an inboard sleeve member having a threaded bore therein and an outboard sleeve member having an unthreaded bore therein, and further including an externally threaded axle bushing receivable through said outboard sleeve member and threadable into said inboard sleeve member, said mounting means including a nut threaded onto said axle bushing to clamp said outboard sleeve member between said inboard sleeve member and said nut.

7. The camber sleeve assembly of claim 6 wherein said camber plate has an opening formed therein, said axle bushing extending through said opening and between said inboard and outboard sleeve members.

8. The camber sleeve assembly of claim 7 wherein said opening in said chamber plate comprises an elongated slot.

9. The camber sleeve assembly of claim 8 wherein said camber plate further defines a row of detents extending generally in a line adjacent to and parallel with said slot, one of said inboard and outboard sleeve members having a lock foot thereon for seated reception into a selected one of said detents.

10. A camber sleeve assembly for mounting a wheel onto the frame of a wheelchair, said assembly comprising:

a camber plate having at least one opening formed therein;

means for mounting said camber plate onto the frame of a wheelchair or the like;

a pair of camber sleeve members cooperatively defining a bore set at a selected camber angle; and means for clamping said camber sleeve members in general alignment with each other on opposite sides of said camber plate, and with said bore oriented in alignment with said plate opening.

11. The camber sleeve assembly of claim 10 wherein one of said camber sleeve members is internally threaded, and further including an externally threaded axle bushing received into said bore to extend through said plate opening in threaded engagement with said one camber sleeve member.

12. The camber sleeve assembly of claim 10 wherein said plate opening comprises an elongated slot, said camber plate further defining a row of detents extending generally parallel to said slot, one of said sleeve members including a lock foot for seated reception into a selected one of said detents.

13. A camber sleeve assembly for mounting a wheel onto the frame of a wheelchair, said assembly comprising:

a camber plate having at least one opening formed therein;

means for mounting said camber plate onto the frame of a wheelchair or the like;

a plurality of pairs of camber sleeve members, with each of said pairs cooperatively defining a bore set at a selected different camber angle; and means for clamping a selected one of said pairs of camber sleeve members on opposite sides of said camber plate in general alignment with each other and with said bore oriented in alignment with said plate opening.

* * * * *